No. 612,419. Patented Oct. 18, 1898.
T. S. HUFLING.
COFFEE POT.
(Application filed Feb. 19, 1898.)
(No Model.)
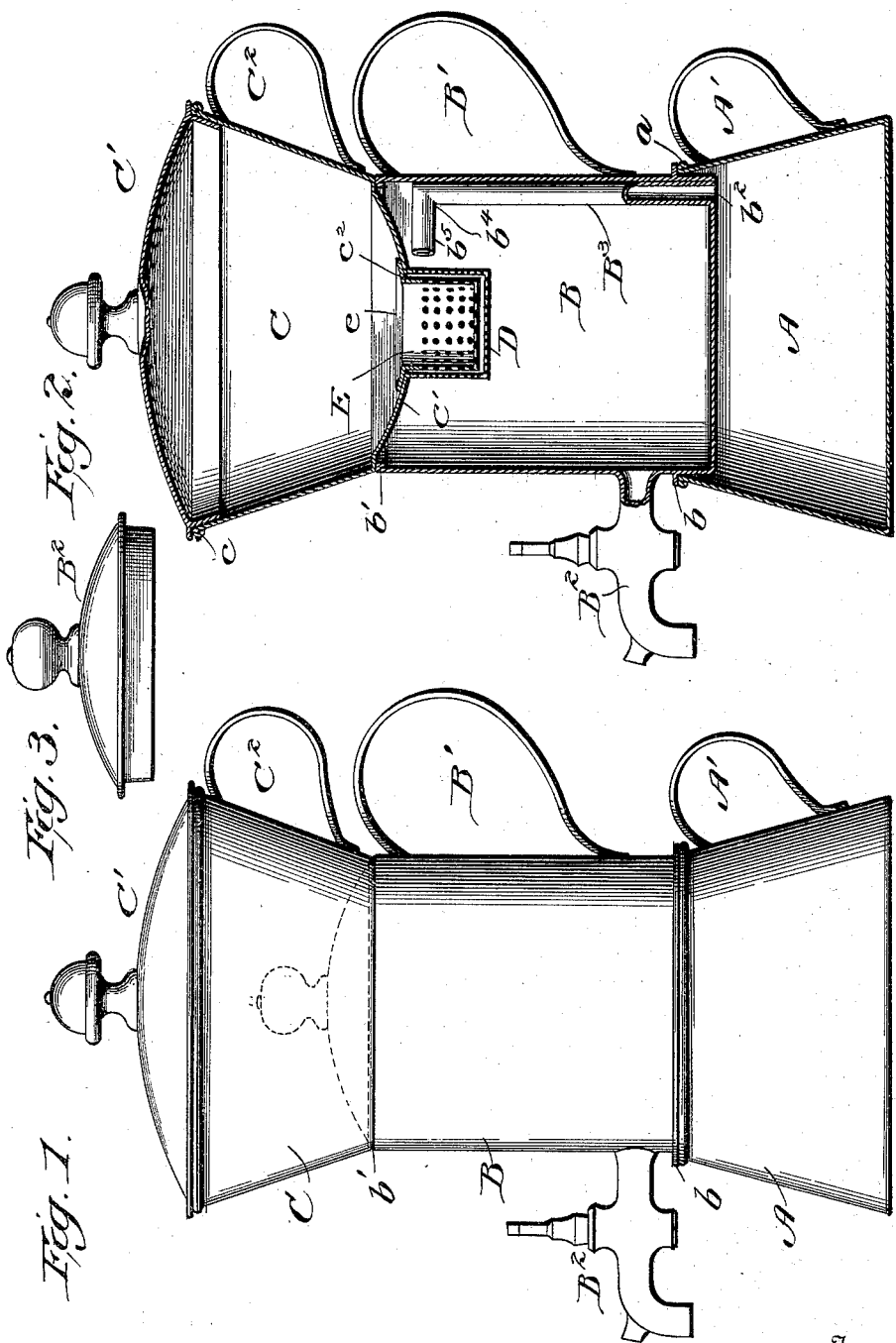

UNITED STATES PATENT OFFICE.

THERON S. HUFLING, OF SCRANTON, PENNSYLVANIA.

COFFEE-POT.

SPECIFICATION forming part of Letters Patent No. 612,419, dated October 18, 1898.

Application filed February 19, 1898. Serial No. 670,939. (No model.)

*To all whom it may concern:*

Be it known that I, THERON S. HUFLING, a citizen of the United States, residing at Scranton, in the county of Lackawanna and State of Pennsylvania, have invented certain new and useful Improvements in Coffee-Pots, of which the following is a specification.

My invention relates to that class of coffee-pots in which steam from a boiler is made to pass into and mingle with the ground coffee. Heretofore in such coffee-pots the steam has been made to pass down upon the top of the ground coffee; but I find that superior results are obtained where the steam is made to act upon the ground coffee laterally near the lower end of the receptacle which contains it. In this way the aroma and caffein are more effectually extracted, the coffee is kept agitated, is more thoroughly soaked, and the water can more effectually pass through the receptacle into the receiver which contains the decoction.

In the accompanying drawings, Figure 1 is a side elevation of the coffee-pot embodying my improvements. Fig. 2 shows a view mainly in vertical central section thereof. Fig. 3 is a detail view of the cover of the vessel which contains the decoction.

The vessel A is preferably frustum-shaped and adapted to rest on a stove or other heater. It is provided with a handle A' and with a beaded upper edge $a$. The vessel B is adapted to contain the decoction. It is provided with a flange $b$, adapted to rest on the beaded upper edge of the vessel A, and with a handle B'. It is also provided with a spout or faucet $B^2$ and a beaded upper edge $b'$. The top or cover $B^2$ is adapted to fit upon and close the vessel B. A pipe $B^3$ is arranged vertically within the vessel B. It has an opening $b^2$ in the bottom of this vessel, and at its upper end has an elbow $b^4$, joining a lateral branch $b^5$, that opens laterally near the central upper portion of the vessel B. The vessel C is also preferably frustum-shaped. It has a beaded upper edge $c$, upon which fits a top or cover C'. The vessel is provided with a handle $C^2$ and with a concavo-convex bottom $c'$, having a central opening $c^2$, around which is secured a cylindrical strainer D. This strainer is perforated at all points and is arranged close to the branch pipe $b^5$. The vessel C is adapted to rest on the upper beaded edge of the vessel B when the top $B^2$ is removed. When the vessel C is removed, the top $B^2$ may be placed upon the vessel B and close it tightly. I preferably also use a supplemental or auxiliary strainer E. The perforations of this strainer are somewhat larger than those in the strainer D, and a space is left between the two strainers, as clearly indicated. The strainer E is formed with a flange $e$ on its upper edge adapted to rest on the bottom $c'$ of the vessel C. This strainer can be readily removed and replaced when desired.

My improved coffee-pot, it will be observed, is made of three main parts, all of which are very simple in construction and may be cheaply made.

In operation ground coffee is made to fill the strainers D and E and to cover the bottom of the vessel C. The vessel C is placed upon the vessel D, as indicated in Fig. 2, and the vessel B is placed over the vessel A, which latter is filled with water that is made to boil by a suitable heater. As soon as the water begins to boil steam rises through the pipe $B^3$ and issues through the pipe $b^5$. It passes through the strainers and through the coffee-grounds contained therein, causing them to swell, become softened, and to emit their caffein and aroma. As the steam condenses the water containing the extract passes down into the vessel B. After the steam has acted in this way for a time boiling water is poured into the vessel C and the top is made to tightly close the vessel. The boiling water passes down through the coffee-grounds and through the strainers into the vessel B. As it passes down this way it is superheated by the steam issuing from the branch pipe $b^5$ and is made to thoroughly extract the juices, aroma, &c., from the ground coffee. Furthermore, the flow of the boiling water is assisted by reason of the fact that the steam keeps the grounds agitated in the strainers, and thus keeps passages open for the flow of the boiling water. If the steam were made to act upon the top of the ground coffee, the water would not be able to pass through the grounds nearly so easily.

My improved coffee-pot has been thoroughly tested and works most efficiently.

I claim as my invention—

1. The combination, substantially as set forth, of the vessel for receiving the decoction, a steam-generating vessel below it, a vessel for containing coffee-grounds, and hot water above the first-mentioned vessel, a strainer depending from said vessel, and a steam-pipe passing from the generator through the vessel containing the decoction and emitting steam laterally against the depending strainer.

2. The combination of a central vessel for receiving the decoction, a lower vessel for generating steam, an upper vessel for containing coffee-grounds and hot water, a strainer depending from the upper vessel into the central vessel, and a steam-pipe extending from the lower vessel or generator, up through the central vessel and emitting steam laterally against the depending strainer.

3. The combination, substantially as set forth, of a central vessel for receiving the decoction, a lower vessel for generating steam, an upper vessel for containing ground coffee and boiling water, a strainer depending from this vessel into the central vessel, another detachable strainer arranged within the first-mentioned strainer, and a steam-pipe extending from the generator, up through the central vessel, and emitting steam laterally against the depending strainers.

In testimony whereof I have hereunto subscribed my name.

THERON S. HUFLING.

Witnesses:
T. F. PENMAN,
B. FENTON TINKHAM.